(12) United States Patent
Khzouz et al.

(10) Patent No.: US 11,066,274 B2
(45) Date of Patent: Jul. 20, 2021

(54) ELECTROMAGNETIC SAFETY TRIGGER

(71) Applicant: Otis Elevator Company, Farmington, CT (US)

(72) Inventors: Erik Khzouz, Plainville, CT (US); Justin Billard, Amston, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 470 days.

(21) Appl. No.: 15/947,328

(22) Filed: Apr. 6, 2018

(65) Prior Publication Data

US 2018/0222718 A1 Aug. 9, 2018

Related U.S. Application Data

(63) Continuation-in-part of application No. 15/179,281, filed on Jun. 10, 2016, now Pat. No. 10,654,686.

(60) Provisional application No. 62/186,635, filed on Jun. 30, 2015.

(51) Int. Cl.
*B66B 5/18* (2006.01)
*F16D 121/32* (2012.01)
*F16D 121/20* (2012.01)

(52) U.S. Cl.
CPC .......... *B66B 5/18* (2013.01); *F16D 2121/20* (2013.01); *F16D 2121/32* (2013.01)

(58) Field of Classification Search
CPC ......... B66B 5/18; B66B 5/22; F16D 2121/20; F16D 2121/22
See application file for complete search history.

(56) References Cited

U.S. PATENT DOCUMENTS

| 6,092,630 | A | * | 7/2000 | Wendel | ............ B66B 5/20 187/373 |
| 6,161,653 | A | | 12/2000 | Skalski et al. | |
| 7,134,529 | B2 | | 11/2006 | Maury | |
| 7,299,898 | B2 | | 11/2007 | Husmann | |

(Continued)

FOREIGN PATENT DOCUMENTS

| CN | 1083018 A | 3/1994 |
| CN | 1789102 A | 6/2006 |

(Continued)

OTHER PUBLICATIONS

Chinese Second Office Action for application CN 201610509130.7, dated Aug. 1, 2019, 9 pages.

(Continued)

*Primary Examiner* — Minh Truong
(74) *Attorney, Agent, or Firm* — Cantor Colburn LLP (57) ABSTRACT

The present disclosure relates generally to a selectively operable safety brake including a magnetic brake operably coupled to a rod and disposed adjacent to a metal component, the magnetic brake configured to move between an engaging position and a non-engaging position, said magnetic brake, when in the engaging position contemporaneously with motion of the machine, moving the rod in to thereby move the safety brake from the non-braking state into the braking state, and an electromagnetic component including a retention apparatus, the electromagnetic component configured to move the magnetic brake from the engaging position to the non-engaging position upon receipt of a resetting signal.

16 Claims, 12 Drawing Sheets

(56) References Cited

U.S. PATENT DOCUMENTS

| | | | |
|---|---|---|---|
| 7,377,371 B2 * | 5/2008 | Reuter | B66D 5/16 |
| | | | 188/188 |
| 7,398,863 B2 | 7/2008 | Liebetrau et al. | |
| 7,575,099 B2 | 8/2009 | Oh et al. | |
| 7,650,969 B2 | 1/2010 | Monzon et al. | |
| 7,849,972 B2 | 12/2010 | Higashinaka | |
| 8,631,909 B2 | 1/2014 | Draper et al. | |
| 8,939,262 B2 * | 1/2015 | Schienda | B66B 5/06 |
| | | | 187/287 |
| 9,169,104 B2 * | 10/2015 | Legeret | B66B 5/04 |
| 2007/0089938 A1 | 4/2007 | Ishioka et al. | |
| 2007/0181378 A1 | 8/2007 | Kigawa et al. | |
| 2007/0272503 A1 | 11/2007 | Kigawa et al. | |
| 2008/0156594 A1 * | 7/2008 | Kobayashi | F16D 59/02 |
| | | | 188/72.3 |
| 2011/0088983 A1 | 4/2011 | Sirigu et al. | |
| 2012/0152659 A1 | 6/2012 | Husmann et al. | |
| 2012/0152663 A1 | 6/2012 | Legeret et al. | |
| 2013/0043097 A1 | 2/2013 | Widmer | |
| 2014/0008157 A1 * | 1/2014 | Terry | B66B 5/22 |
| | | | 187/359 |
| 2014/0326544 A1 | 11/2014 | Husmann | |
| 2015/0259175 A1 | 9/2015 | West et al. | |

FOREIGN PATENT DOCUMENTS

| | | |
|---|---|---|
| CN | 1886320 A | 12/2006 |
| CN | 101535163 A | 9/2009 |
| CN | 102923547 A | 2/2013 |
| EP | 1813566 A1 | 8/2007 |
| EP | 2258650 A2 | 12/2010 |
| WO | 2000039016 A1 | 7/2000 |
| WO | 201146073 A1 | 11/2011 |
| WO | 2013070234 A1 | 5/2013 |
| WO | 2015047391 A1 | 4/2015 |
| WO | 2017087978 A1 | 5/2017 |
| WO | 2017098299 A1 | 6/2017 |

OTHER PUBLICATIONS

European Search Report for application EP 19167273.2, dated Jan. 8, 2020, 79 pages.
Notice of Allowance for U.S. Appl. No. 15/179,281, dated Jan. 15, 2020, 6 pages.
Chinese Office Action for application CN 201910271150.9, dated May 18, 2020, 8 pages.
Chinese Office Action for application CN 201610509130.7, dated Feb. 1, 2019, 7 pages.
European Office Action for application EP 16177329.6, dated Jan. 23, 2019, 7 pages.

* cited by examiner

ELECTROMAGNETIC SAFETY TRIGGER

CROSS REFERENCE TO RELATED APPLICATIONS

The present application is a continuation-in-part of, and claims the priority benefit of, U.S. patent application Ser. No. 15/179,281 filed Jun. 10, 2016, which is related to, and claims the priority benefit of, U.S. Provisional Patent Application Ser. No. 62/186,635 filed Jun. 30, 2015, the contents of all of which are hereby incorporated in their entireties into the present disclosure.

TECHNICAL FIELD OF THE DISCLOSED EMBODIMENTS

The present disclosure is generally related to braking and/or safety systems and, more specifically, an electromagnetic safety trigger.

BACKGROUND OF THE DISCLOSED EMBODIMENTS

Some machines, such as an elevator system, include a safety system to stop the machine when it rotates or travels at excessive speeds in response to an inoperative component. Generally, a traditional safety system includes a significant number of components that are required to effectively operate the system. These additional components increase installation time and costs. There is therefore a need for a safety system that reduces the number of components and is cost effective.

SUMMARY OF THE DISCLOSED EMBODIMENTS

In one aspect, selectively operable braking device for an elevator system is provided. The selectively operable braking device includes a safety brake disposed on the car and adapted to be wedged against one of the guiderails when moved from a non-braking state into a braking state, a rod operably coupled to the safety brake, the rod configured to move the safety brake between the non-breaking state and braking state, a magnetic brake operably coupled to the rod and disposed adjacent to the guiderail, the magnetic brake configured to move between a rail-engaging position and a rail-non-engaging position, said magnetic brake, when in the rail-engaging position contemporaneously with motion of the car, moving the rod in a direction to thereby move the safety brake from the non-braking state into the braking state, and an electromagnetic component, the electromagnetic component configured to move the magnetic brake from the rail-engaging position to the rail-non-engaging position upon receipt of a resetting signal.

In an embodiment, the selectively operable braking device further includes a safety controller in electrical communication with the electromagnetic component, the safety controller configured to send a trigger signal and the resetting signal, wherein the electromagnetic component is configured to move the magnetic brake to the rail-engaging position upon receipt of the trigger signal. In any of the preceding embodiments, the electromagnetic component is configured to hold the magnetic brake in the rail-non-engaging position.

In any of the preceding embodiments, the electromagnetic component further includes a retention apparatus. In an embodiment, the retention apparatus comprises a housing wall, wherein in some embodiments, the retention apparatus further includes a biasing member configured to move the electromagnetic component in a direction parallel to an actuation axis. In further embodiments, the retention apparatus further includes at least one spring configured to move the electromagnetic component in a direction parallel to an actuation axis. In further embodiments, the retention apparatus further includes a motor and a threaded rod threadingly engaged with the electromagnetic component and configured to move the electromagnetic component in a direction parallel to an actuation axis. In another embodiment, the retention apparatus is configured to return the magnetic brake, the electromagnetic component, or both, to the rail-non-engaging position when the electromagnetic component and the magnetic brake are fully engaged.

Other embodiments are also disclosed.

BRIEF DESCRIPTION OF THE DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein.

DETAILED DESCRIPTION OF THE DISCLOSED EMBODIMENTS

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

Figure 1:
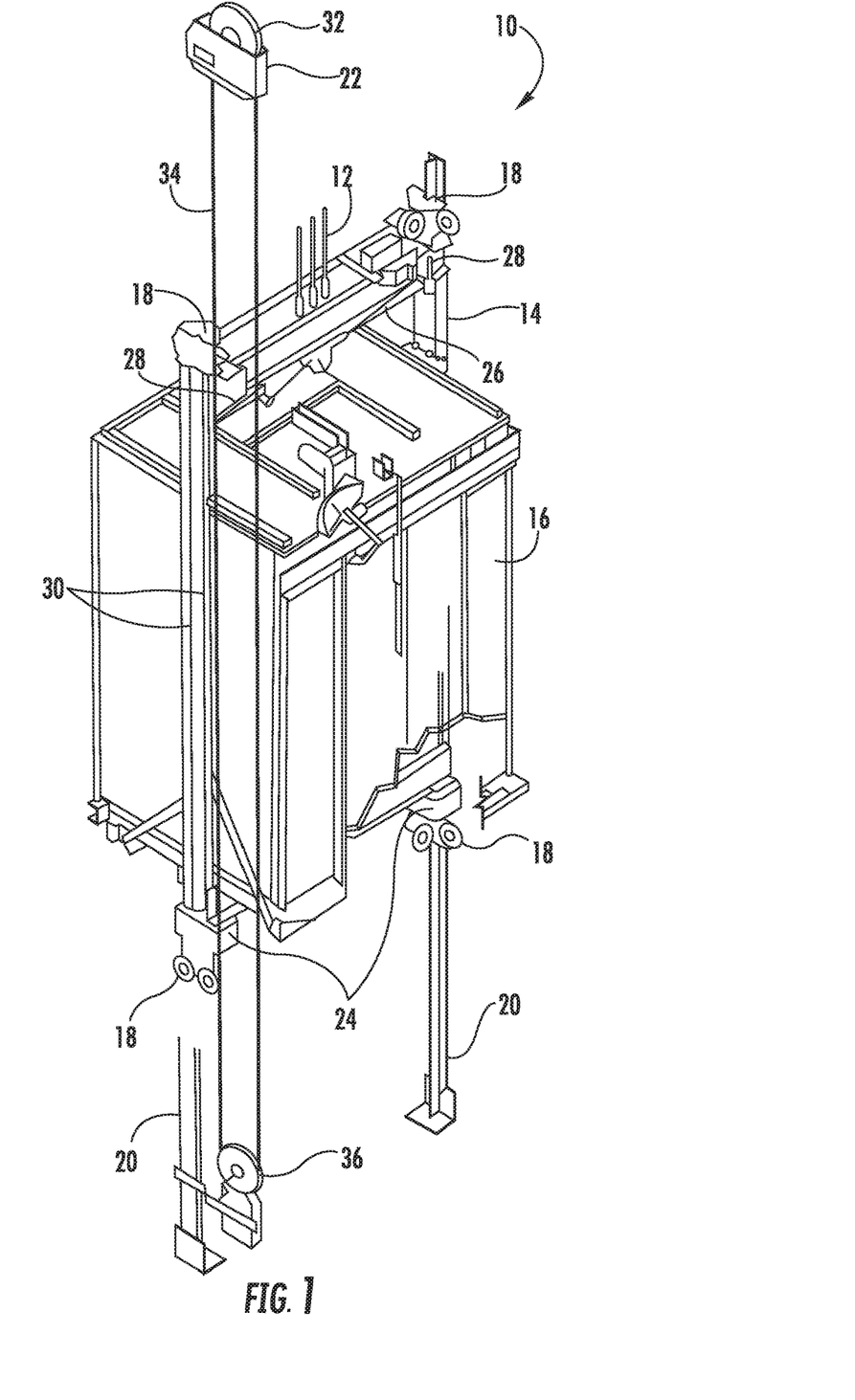
FIG. 1 is a schematic diagram of an elevator system employing a mechanical governor.

FIG. 1 shows an elevator system, generally indicated at 10. The elevator system 10 includes cables 12, a car frame 14, a car 16, roller guides 18, guide rails 20, a governor 22, safeties 24, linkages 26, levers 28, and lift rods 30. Governor 22 includes a governor sheave 32, rope loop 34, and a tensioning sheave 36. Cables 12 are connected to car frame 14 and a counterweight (not shown in FIG. 1) inside a hoistway. Car 16, which is attached to car frame 14, moves up and down the hoistway by force transmitted through cables 12 to car frame 14 by an elevator drive (not shown) commonly located in a machine room at the top of the hoistway. Roller guides 18 are attached to car frame 14 to guide the car 16 up and down the hoistway along guide rail 20. Governor sheave 32 is mounted at an upper end of the hoistway. Rope loop 34 is wrapped partially around governor sheave 32 and partially around tensioning sheave 36 (located in this embodiment at a bottom end of the hoistway). Rope loop 34 is also connected to elevator car 16 at lever 28, ensuring that the angular velocity of governor sheave 32 is directly related to the speed of elevator car 16.

In the elevator system 10 shown in FIG. 1, governor 22, an electromechanical brake (not shown) located in the machine room, and safeties 24 act to stop elevator car 16 if car 16 exceeds a set speed as it travels inside the hoistway. If car 16 reaches an over-speed condition, governor 22 is triggered initially to engage a switch, which in turn cuts power to the elevator drive and drops the brake to arrest movement of the drive sheave and thereby arrest movement of car 16. If, however, cables 12 break or car 16 otherwise experiences a free-fall condition unaffected by the brake, governor 22 may then act to trigger safeties 24 to arrest movement of car 16. In addition to engaging a switch to drop the brake, governor 22 also releases a clutching device that grips the governor rope 34. Governor rope 34 is connected to safeties 24 through mechanical linkages 26, levers 28, and lift rods 30. As car 16 continues its descent unaffected by the brake, governor rope 34, which is now prevented from moving by actuated governor 22, pulls on operating lever 28. Operating lever 28 "sets" safeties 24 by moving linkages 26 connected to lift rods 30, which lift rods 30 cause safeties 24 to engage guide rails 20 to bring car 16 to a stop.

Figure 2:
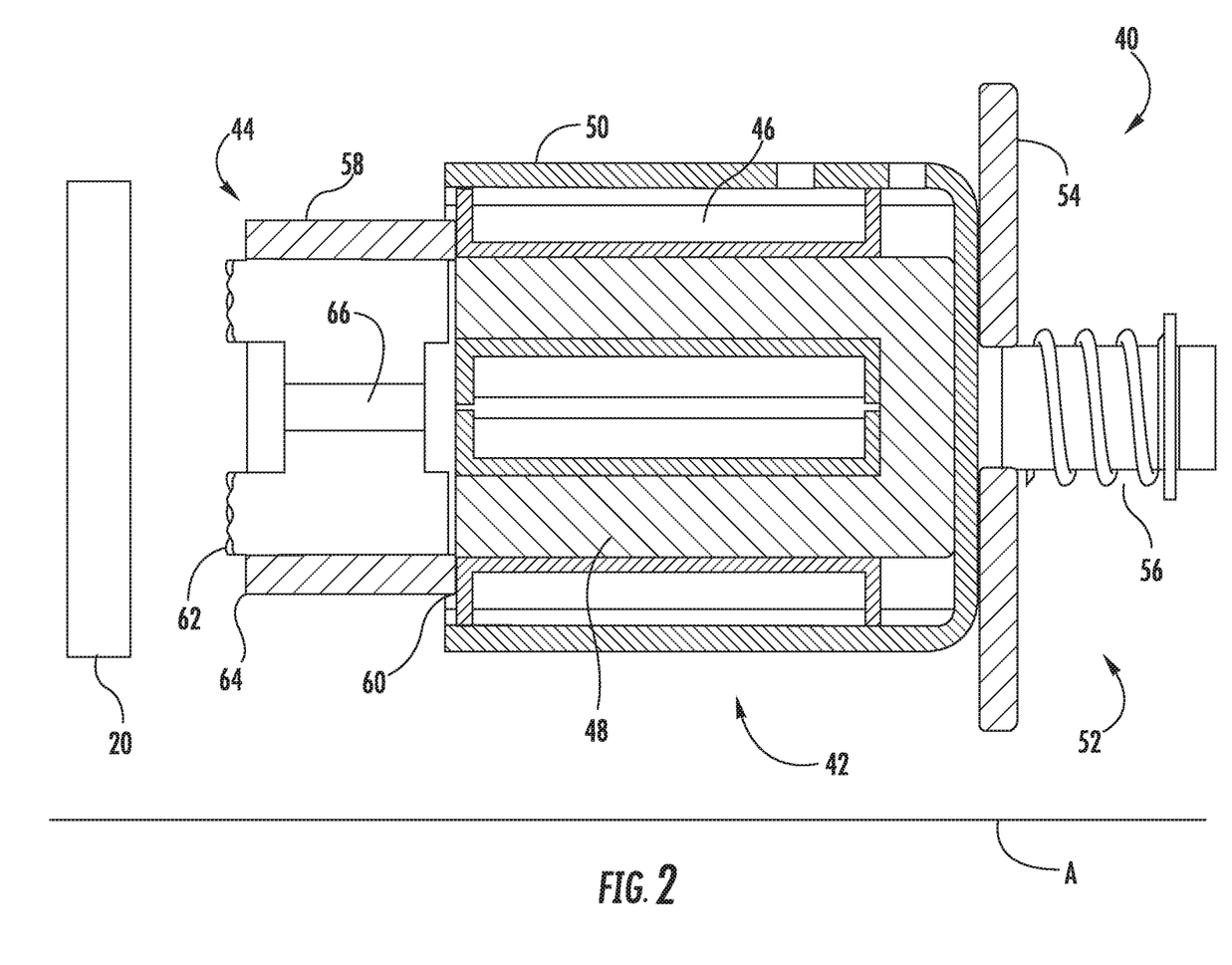
FIG. 2 is a cross-sectional view of an electromagnetic safety trigger in a non-braking state according to an embodiment of the present disclosure.

FIG. 2 shows an embodiment of an electromagnetic safety trigger 40 for an elevator safety system in a normal operating state. The electromagnetic safety trigger 40 includes an electromagnetic component 42 and a magnetic brake 44. The electromagnetic component 42 includes a coil 46 and a core 48 disposed within a housing 50. The electromagnetic component 42 further includes a retention apparatus 52. In the embodiment shown, the retention apparatus 52 includes a housing wall 54 and at least one resetting spring 56. The at least one resetting spring 56 is configured to move the electromagnetic component 42 in a direction parallel to the axis A. In an embodiment, the housing wall 54 may be flexible and configured to move the electromagnetic component 42 in a direction parallel to the axis A. In such an embodiment, the at least one resetting spring 56 may not be required. The magnetic brake 44 includes a holder 58 having a first end 60 and a brake portion 62 disposed on a second end 64. A magnet 66 is disposed within the holder 58, and configured to magnetically couple the magnetic brake 44 to the electromagnetic component 42 in a non-engaging position and to a metal component of the system (e.g. the guide rails 20) in an engaging position.

For example, in the non-engaging position, the magnetic brake 44 is attracted and held to the electromagnetic component 42 via the core 48. The at least one resetting spring 56 is operative to hold the electromagnetic component 42 in normal operating state (i.e. non-engaging position). The at least one resetting spring 56 includes a preset tension such that the attraction force between the magnetic brake 44 and the guide rails 20 is far less than the holding force provided by the at least one resetting spring 56.

Figure 3:
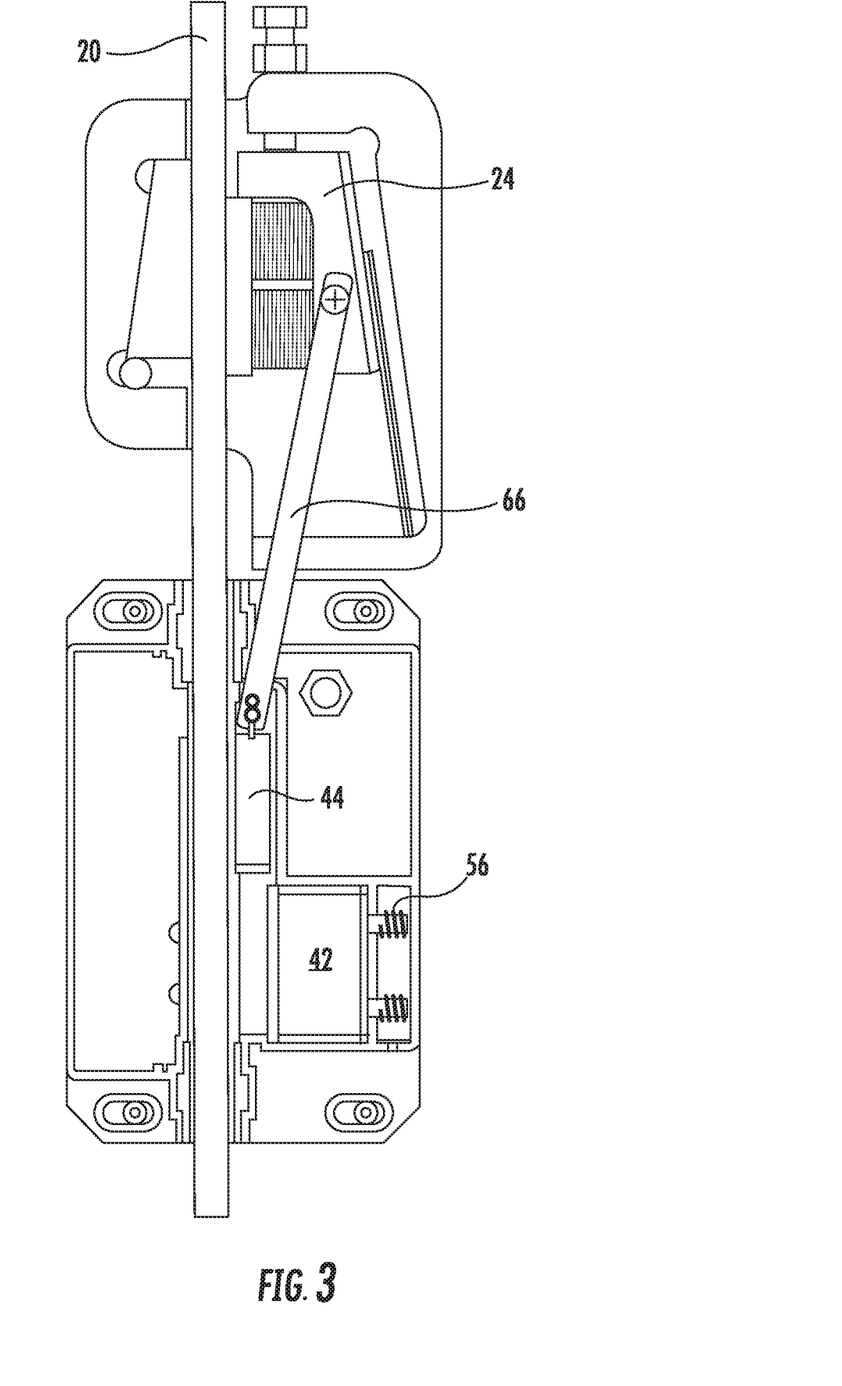
FIG. 3 is a side view of the electromagnetic safety trigger in a braking state according to an embodiment of the present disclosure.
Figure 4:
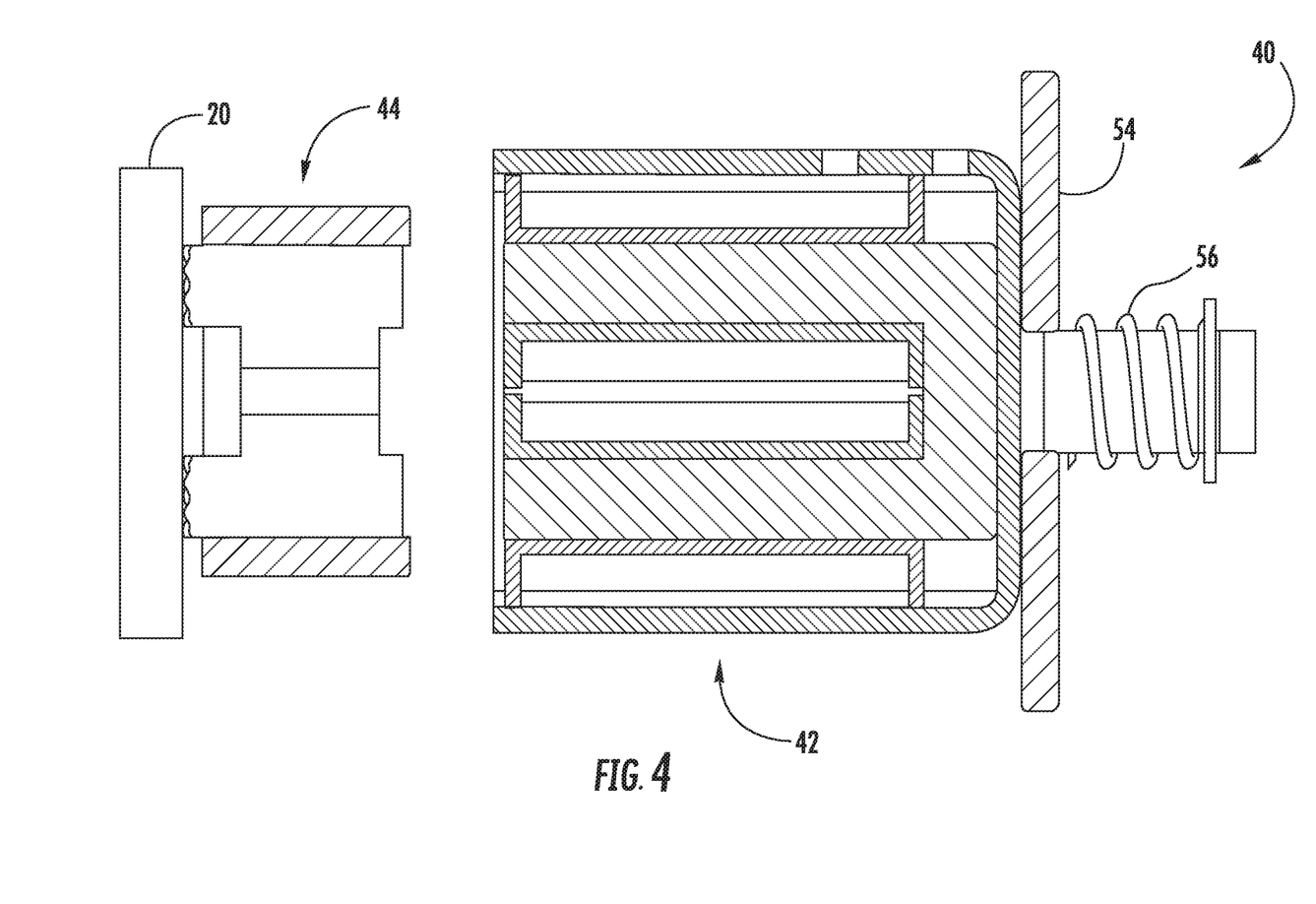
FIG. 4 is a cross-sectional view of the electromagnetic safety trigger at the braking position and is in an actuated state according to an embodiment of the present disclosure.

In the event of an overspeed condition of elevator car 16 in the down direction, the electromagnetic component 42 propels the magnetic brake 44 towards the guide rail 20 as shown in FIGS. 3 and 4. As a result, the safety 24 is pushed in an upward direction by a small linkage bar 66 operably coupled to the safety 24 and the magnetic brake 44 when relative motion is created by the magnetic brake 44 sticking to the guide rail 20.

Figure 5:
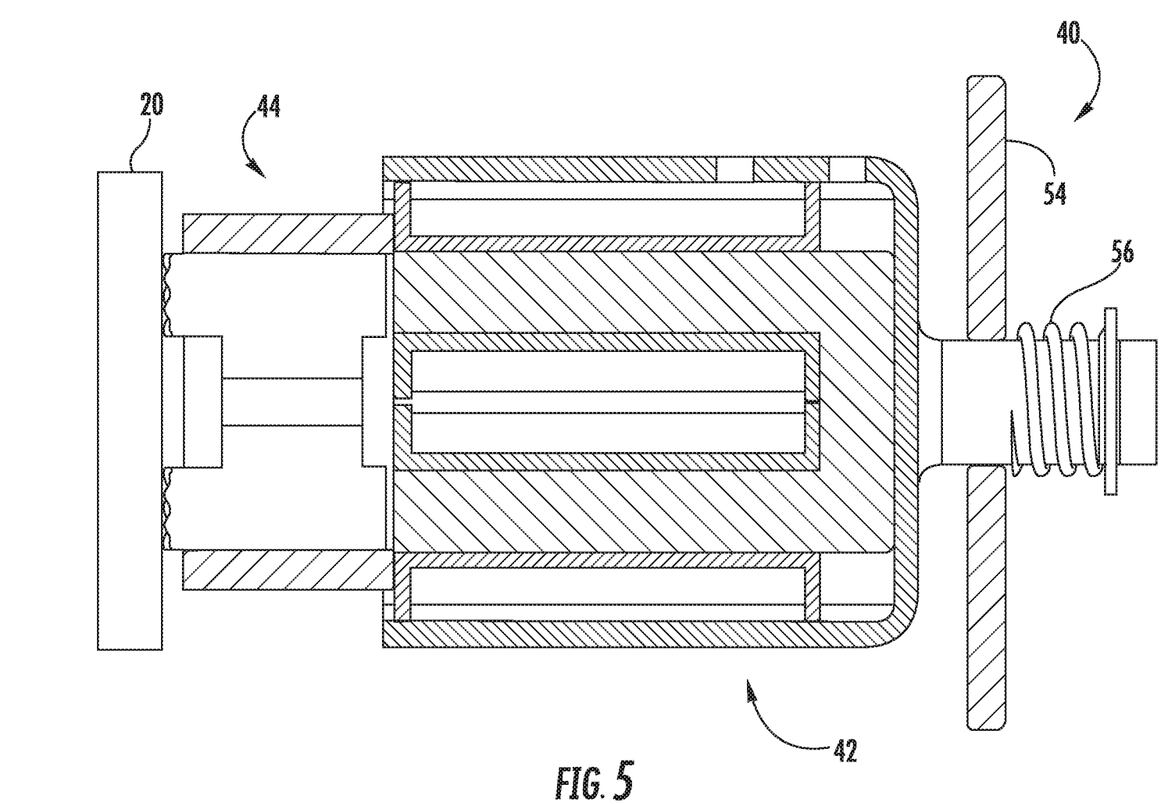
FIG. 5 is a cross-sectional view of the electromagnetic safety trigger at the braking position and is in the state transition from a braking state to a non-braking state according to an embodiment of the present disclosure.

FIG. 5 shows the electromagnetic safety trigger 40 in a transition state from a braking state to a non-braking state. After the car 16 has come to a stop, the car 16 is moved in the opposite direction of travel until the magnetic brake 44 and the electromagnetic component 42 are substantially aligned. A reverse current energizes the electromagnetic component 42 such that the electromagnetic component 42 overcomes the spring force of the at least one resetting spring 56 and moves towards the magnetic brake 44. When the electromagnetic component 42 and the magnetic brake 44 are fully engaged, the magnetic force between the magnetic brake 44 and the rail 20 is significantly reduced due to the change of magnetic circuit. As such, the force created by the at least one resetting spring 56 is able to pull the magnetic brake 44 and electromagnetic component 42 together to return to the normal operating state (i.e. the non-engaging position, see FIG. 2).

While the embodiment of the electromagnetic safety trigger 40 is shown in use with an elevator system 10, it will be appreciated that the electromagnetic safety trigger 40 may be suitable for any large stroke range application, such as a rotary arrangement and linear arrangement machines to name a couple of non-limiting example.

Figure 6:
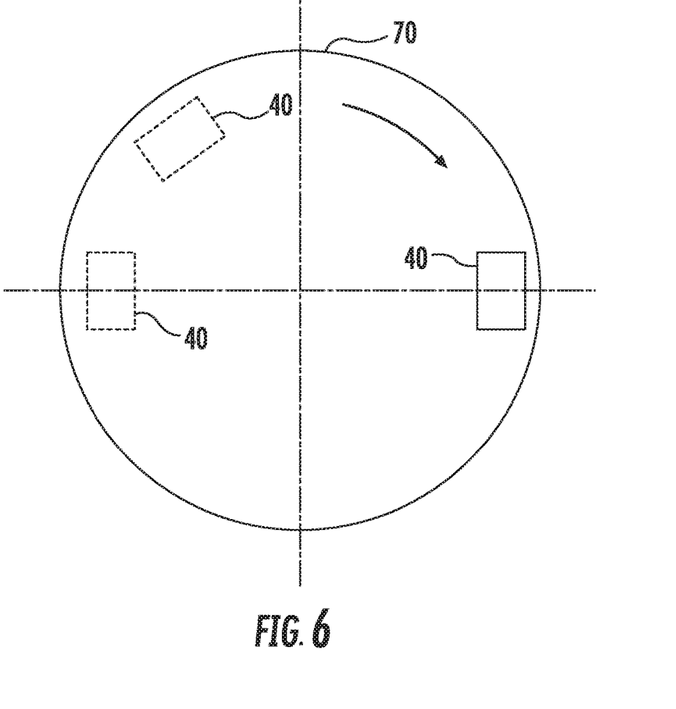
FIG. 6 is front view of a rotary arrangement machine according to an embodiment of the present disclosure.
Figure 7:
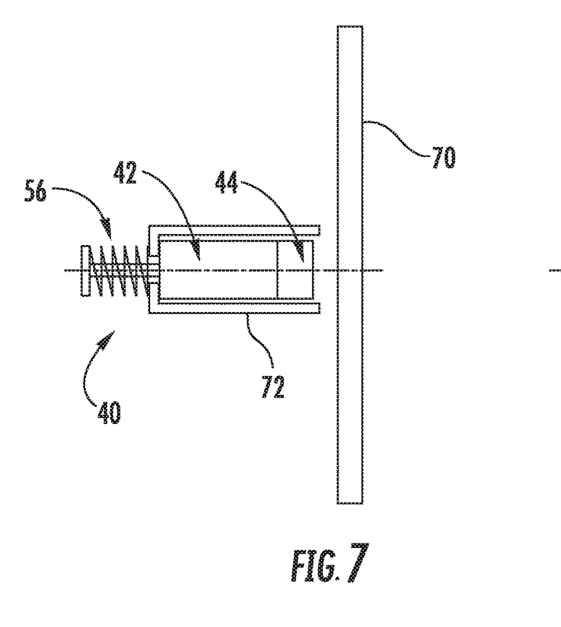
FIG. 7 is a cross-sectional view of an electromagnetic safety trigger according to an embodiment of the present disclosure.
Figure 8:
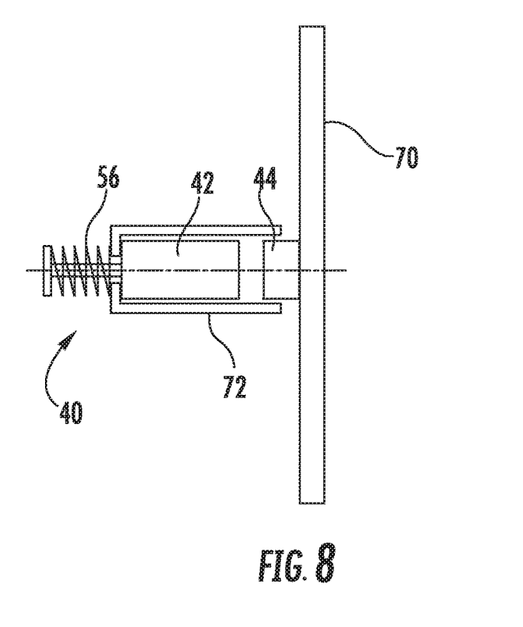
FIG. 8 is a cross-sectional view of an electromagnetic safety trigger in a braking state according to an embodiment of the present disclosure.

For example, FIGS. 6-8 show the electromagnetic safety trigger 40 with a rotary arrangement machine 70. One or more electromagnetic safety triggers 40 are shown disposed within a stationary housing, and located adjacent to the rotary arrangement machine 70. As the magnetic brake 44 is propelled to fully engage the rotary arrangement machine 70, as shown in FIG. 8, a portion of the magnetic brake 44 remains within the stationary housing 72 to arrest rotation of the rotary arrangement machine 70.

Figure 9:
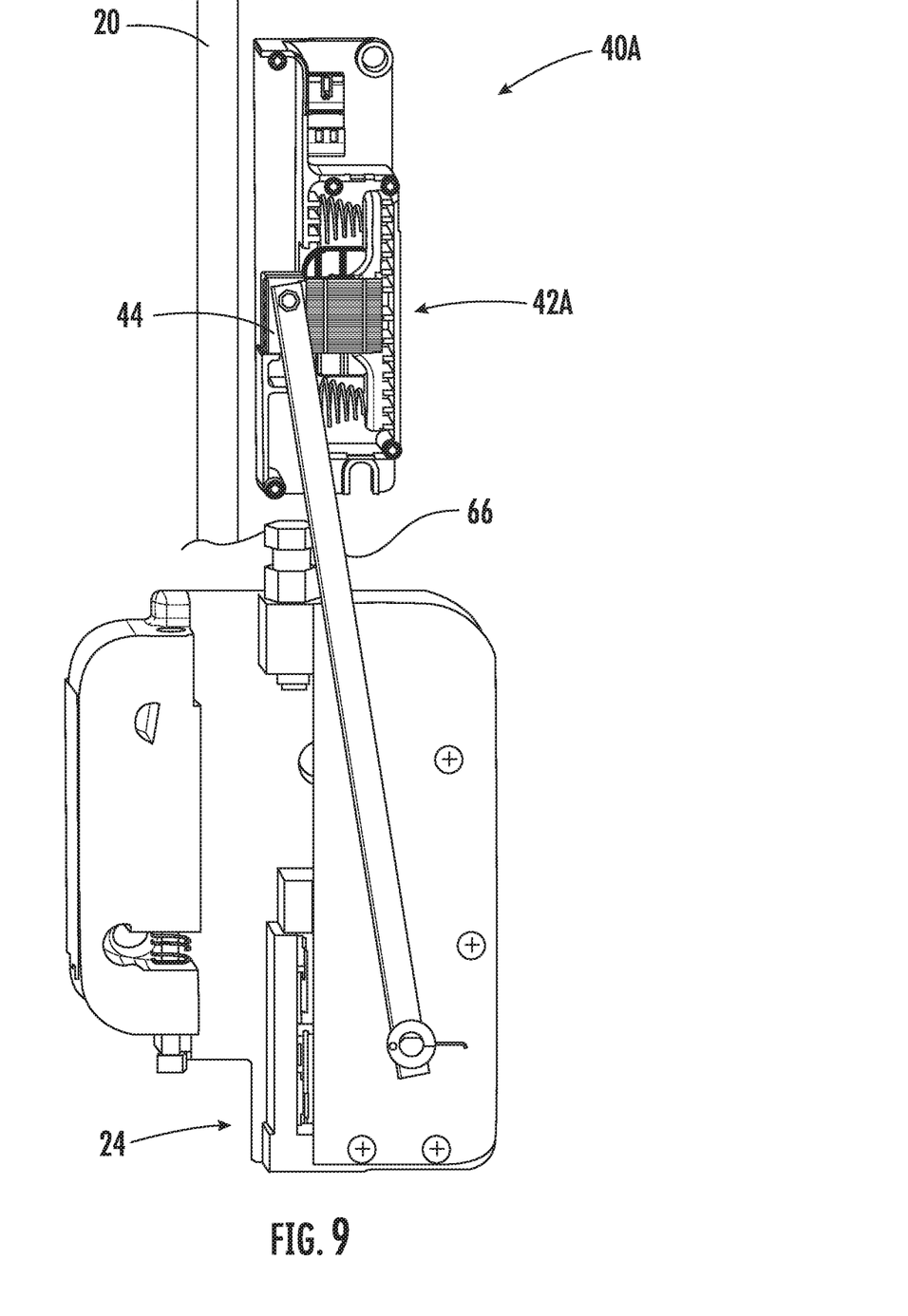
FIG. 9 is a side view of the electromagnetic safety trigger according to an embodiment of the present disclosure.
Figure 10:
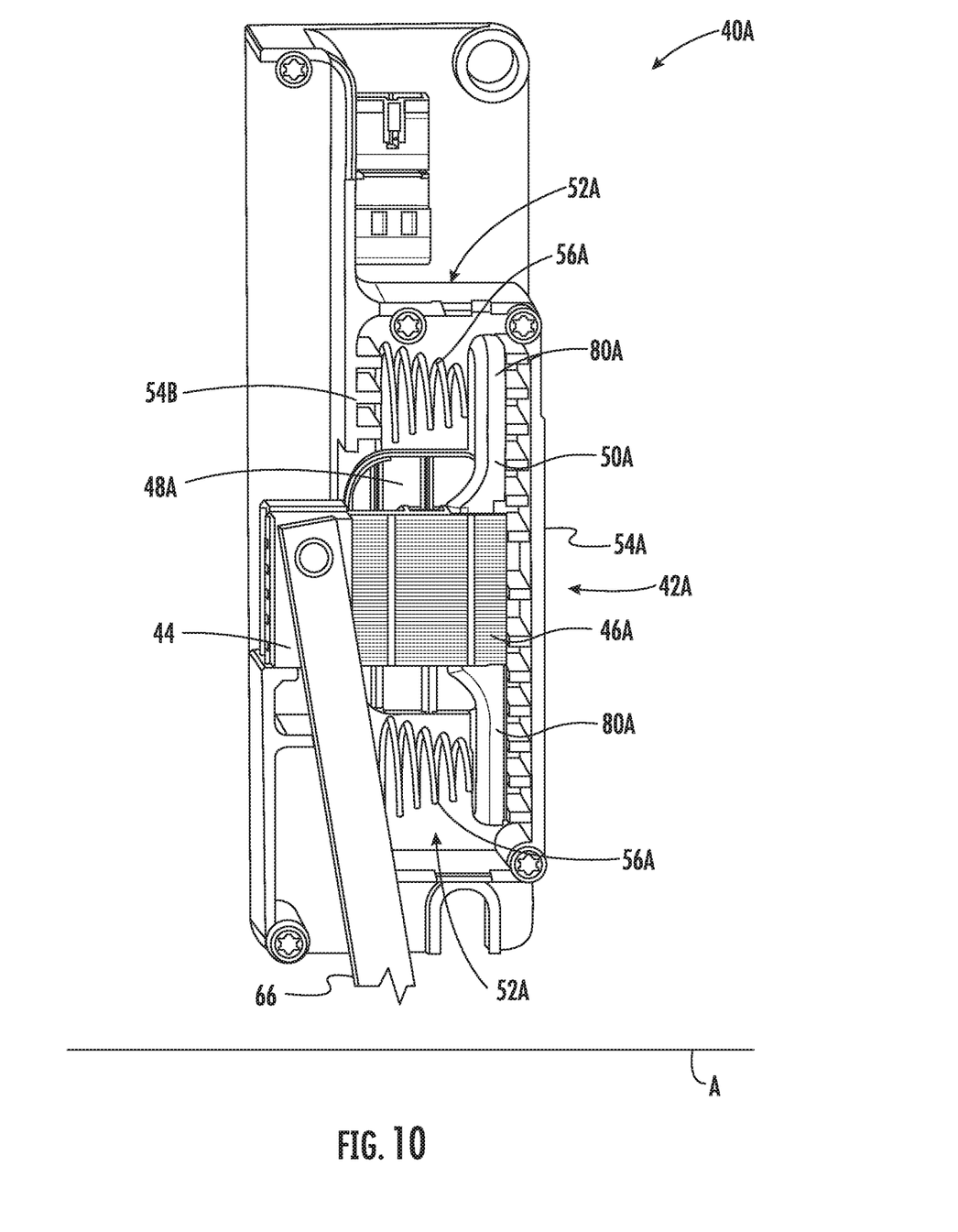
FIG. 10 is a cross-sectional view of an electromagnetic safety trigger according to an embodiment of the present disclosure.

In other embodiments, the retention apparatus 52 may be moved in order to create a slimmer width of the safety trigger 40. One such embodiment is shown in FIGS. 9 and 10, in which are illustrated an embodiment of an electromagnetic safety trigger 40A for an elevator safety system in a normal operating state. The electromagnetic safety trigger 40A includes an electromagnetic component 42A and a magnetic brake 44. The electromagnetic component 42A includes a core 46A and a coil 48A attached to a housing 50A that passes through the core 46A. The housing 50A includes extending portions 80A. The electromagnetic component 42A further includes a retention apparatus 52A. In the embodiment shown, the retention apparatus 52A includes a housing wall 54A, an opposing housing wall 54B, and at least one biasing member. In the illustrated embodiment, the at least one biasing member comprises at least one resetting spring 56A. In one embodiment, there are two resetting springs 56A disposed between the housing wall 54B and the extending portions 80A of the housing 50A. In other embodiments, there may be fewer or greater than two resetting springs 56A. The at least one resetting springs 56A are configured to move the electromagnetic component 42A in a direction parallel to the axis A. The resetting springs 56A in the illustrated embodiment comprise compression conical springs that can compress to the diameter of the wire from which they are formed. It will be appreciated from the present disclosure that any type of compression springs (i.e., non-conical compression springs) may be used.

Figure 11:
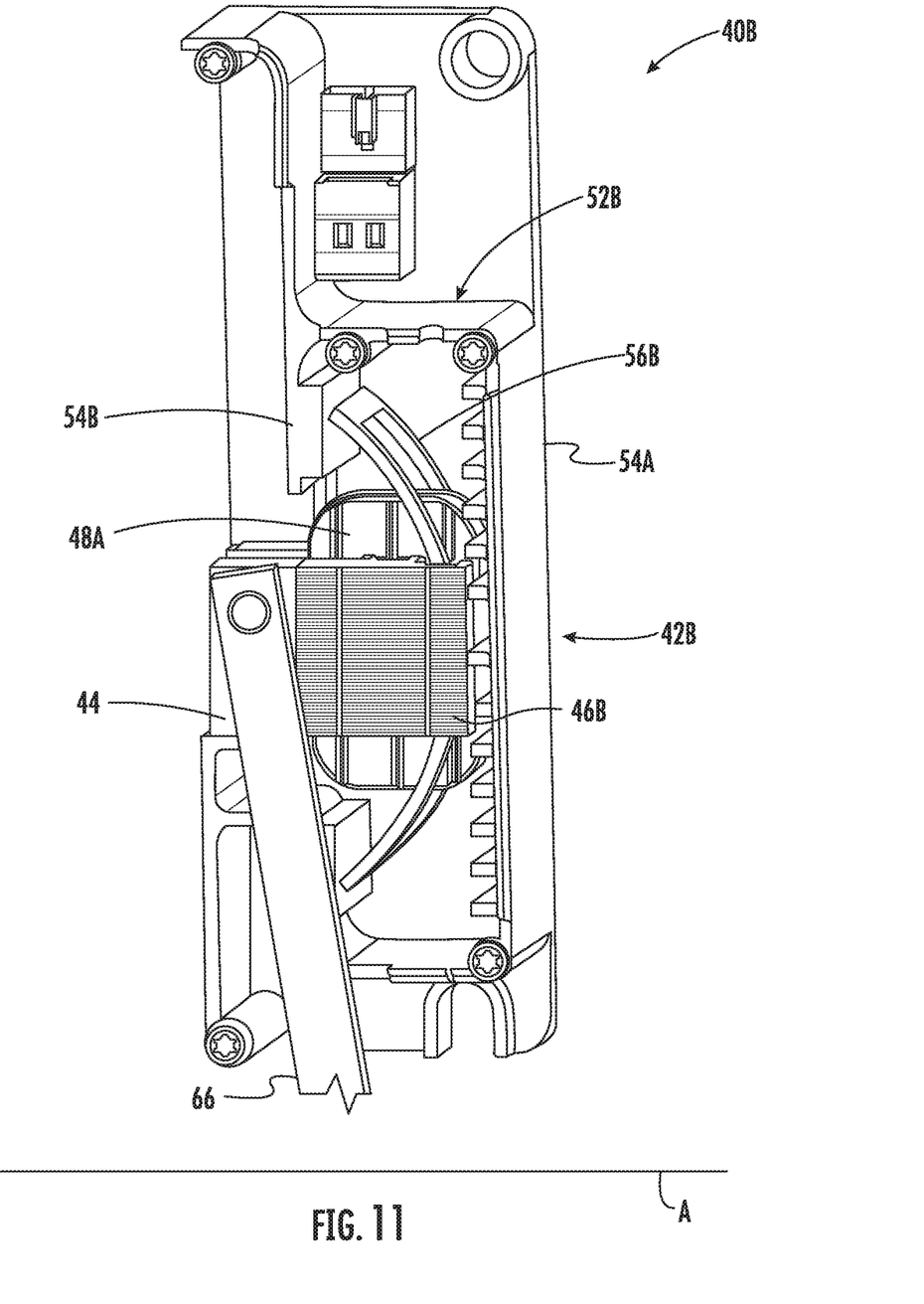
FIG. 11 is a cross-sectional view of an electromagnetic safety trigger according to an embodiment of the present disclosure.

Another embodiment is shown in FIG. 11, in which is illustrated an embodiment of an electromagnetic safety trigger 40B for an elevator safety system in a normal operating state. The electromagnetic safety trigger 40B includes an electromagnetic component 42B and a magnetic brake 44. The electromagnetic component 42B includes a core 46B and a coil 48A. The electromagnetic component 42B further includes a retention apparatus 52B. In the embodiment shown, the retention apparatus 52B includes a housing wall 54A, an opposing housing wall 54B, and a resetting spring 56B. In the illustrated embodiment, the resetting spring 56B comprises a leaf spring that extends between the housing wall 54B on one side of the electromagnetic component 42B, through the core 46B and to the housing wall 54B on one side of the electromagnetic component 42B. In other embodiments, there may be fewer or greater than one resetting spring 56B. In some embodiments, the resetting spring may extend in an arc only from the housing wall 54B to the electromagnetic component 42B on one side thereof. In other embodiments, this configuration of resetting spring 56B is disposed on either side of the electromagnetic component 42B, but the arced resetting springs 56B are not coupled together. The resetting spring 56B is configured to move the electromagnetic component 42B in a direction parallel to the axis A.

Figure 12:
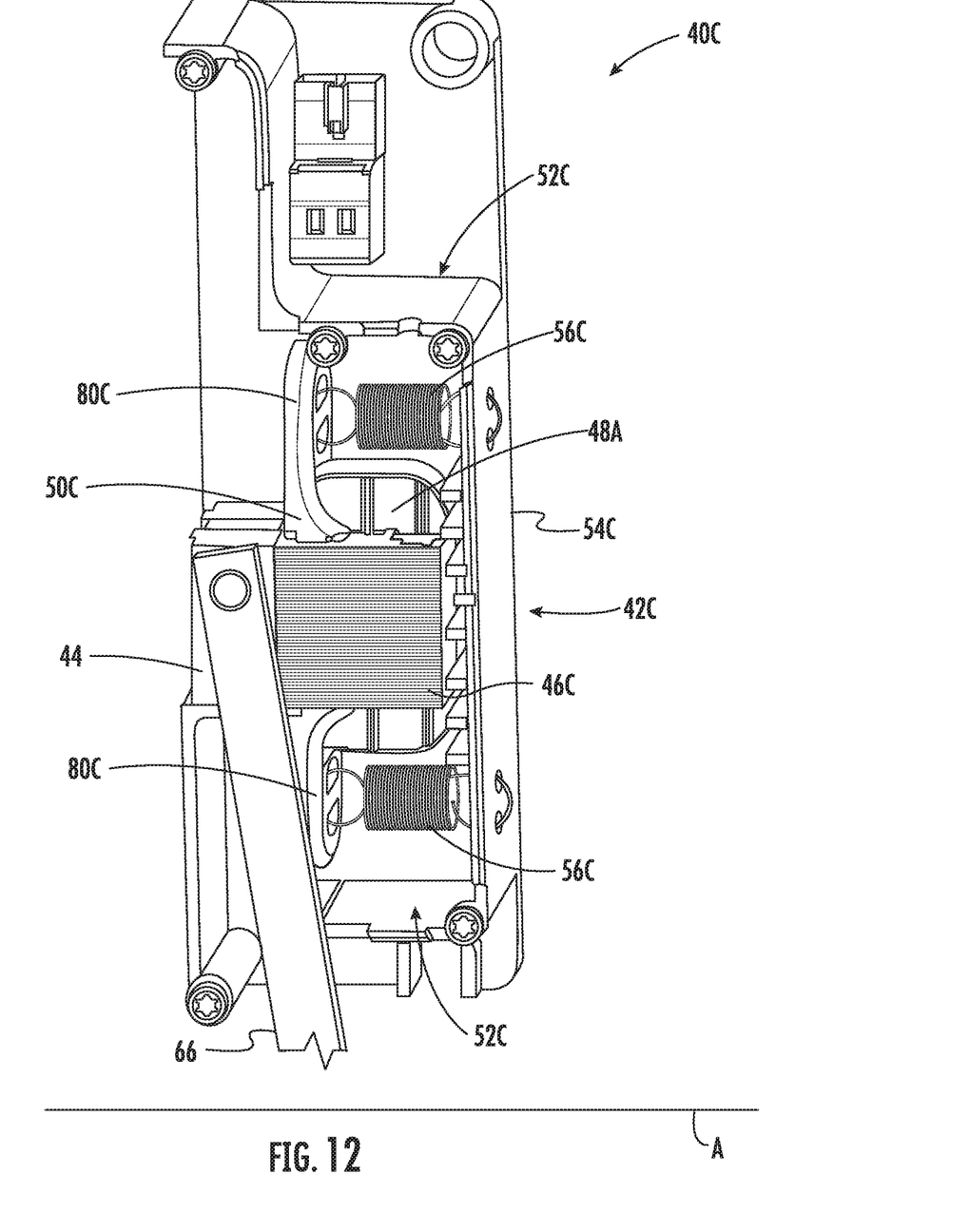
FIG. 12 is a cross-sectional view of an electromagnetic safety trigger according to an embodiment of the present disclosure.

Another embodiment is shown in FIG. 12, in which is illustrated an embodiment of an electromagnetic safety trigger 40C for an elevator safety system in a normal operating state. The electromagnetic safety trigger 40C includes an electromagnetic component 42C and a magnetic brake 44. The electromagnetic component 42C includes a core 46C and a coil 48A attached to a housing 50C that passes through the core 46C. The housing 50C includes extending portions 80C. The electromagnetic component 42C further includes a retention apparatus 52C. In the embodiment shown, the retention apparatus 52C includes a housing wall 54C and at least one resetting spring 56C. In the illustrated embodiment, there are two resetting springs 56C disposed between the housing wall 54C and the extending portions 80C of the housing 50C. In other embodiments, there may be fewer or greater than two resetting springs 56C. The resetting springs 56C in the illustrated embodiment comprise tension springs. The at least one resetting springs 56C are configured to move the electromagnetic component 42C in a direction parallel to the axis A.

Figure 13:
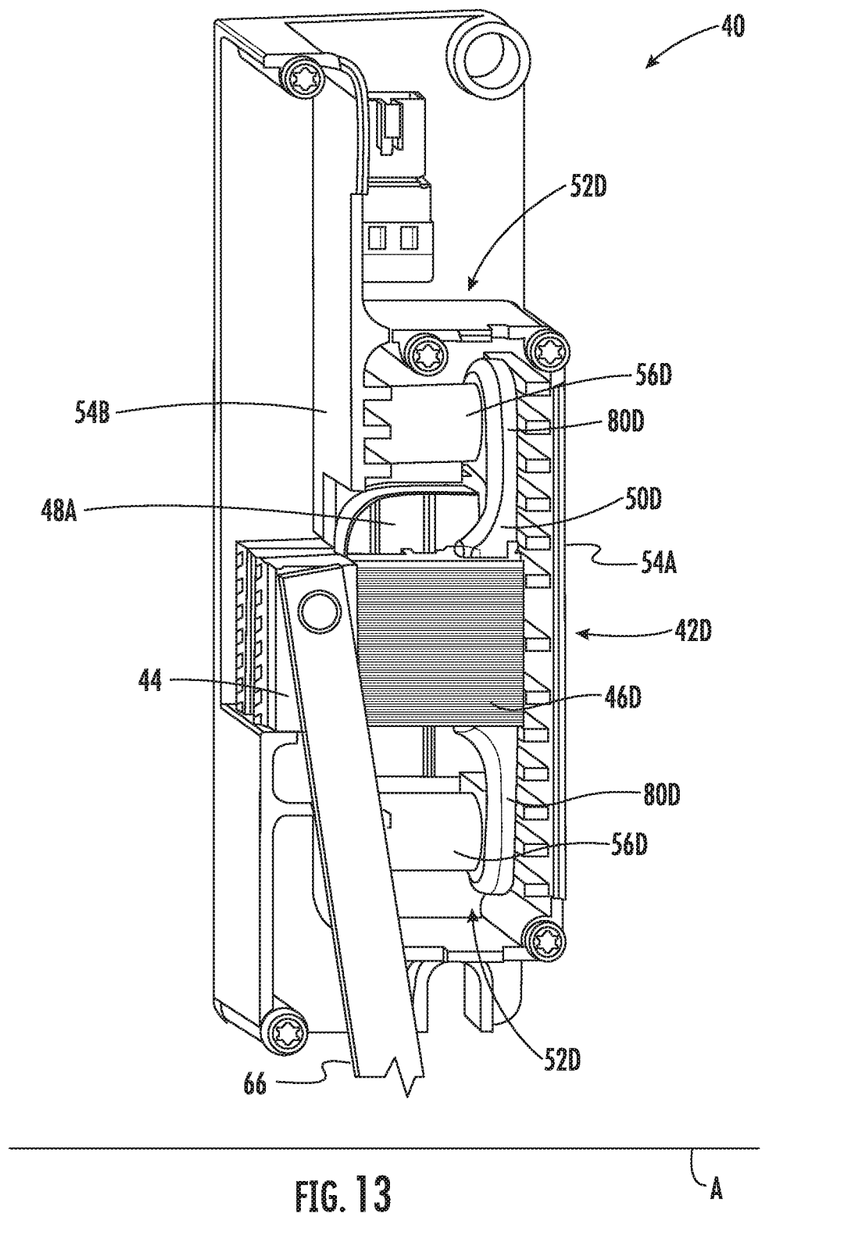
FIG. 13 is a cross-sectional view of an electromagnetic safety trigger according to an embodiment of the present disclosure.

Another embodiment is shown in FIG. 13, in which is illustrated an embodiment of an electromagnetic safety trigger 40D for an elevator safety system in a normal operating state. The electromagnetic safety trigger 40D includes an electromagnetic component 42D and a magnetic brake 44. The electromagnetic component 42D includes a core 46D and a coil 48A attached to a housing 50D that passes through the core 46D. The housing 50D includes extending portions 80D. The electromagnetic component 42D further includes a retention apparatus 52D. In the embodiment shown, the retention apparatus 52D includes a housing wall 54A, an opposing housing wall 54B, and at least one resetting spring 56D. In the illustrated embodiment, there are two resetting springs 56D disposed between the housing wall 54B and the extending portions 80D of the housing 50D. In other embodiments, there may be fewer or greater than two resetting springs 56D. The at least one resetting springs 56D are configured to move the electromagnetic component 42D in a direction parallel to the axis A. The resetting springs 56D in the illustrated embodiment comprise compressible foam members that return to their original shape when the compressive force acting upon them is sufficiently low.

In all of the above embodiments, it will be appreciated from the above description that the resetting springs 56 may be moved to a location behind the core 46/coil 48 (i.e., into the page) and/or to a location in front of the core 46/coil 48 (i.e., out of the page). Such positioning will reduce the height of the electromagnetic safety trigger 40.

Figure 14:
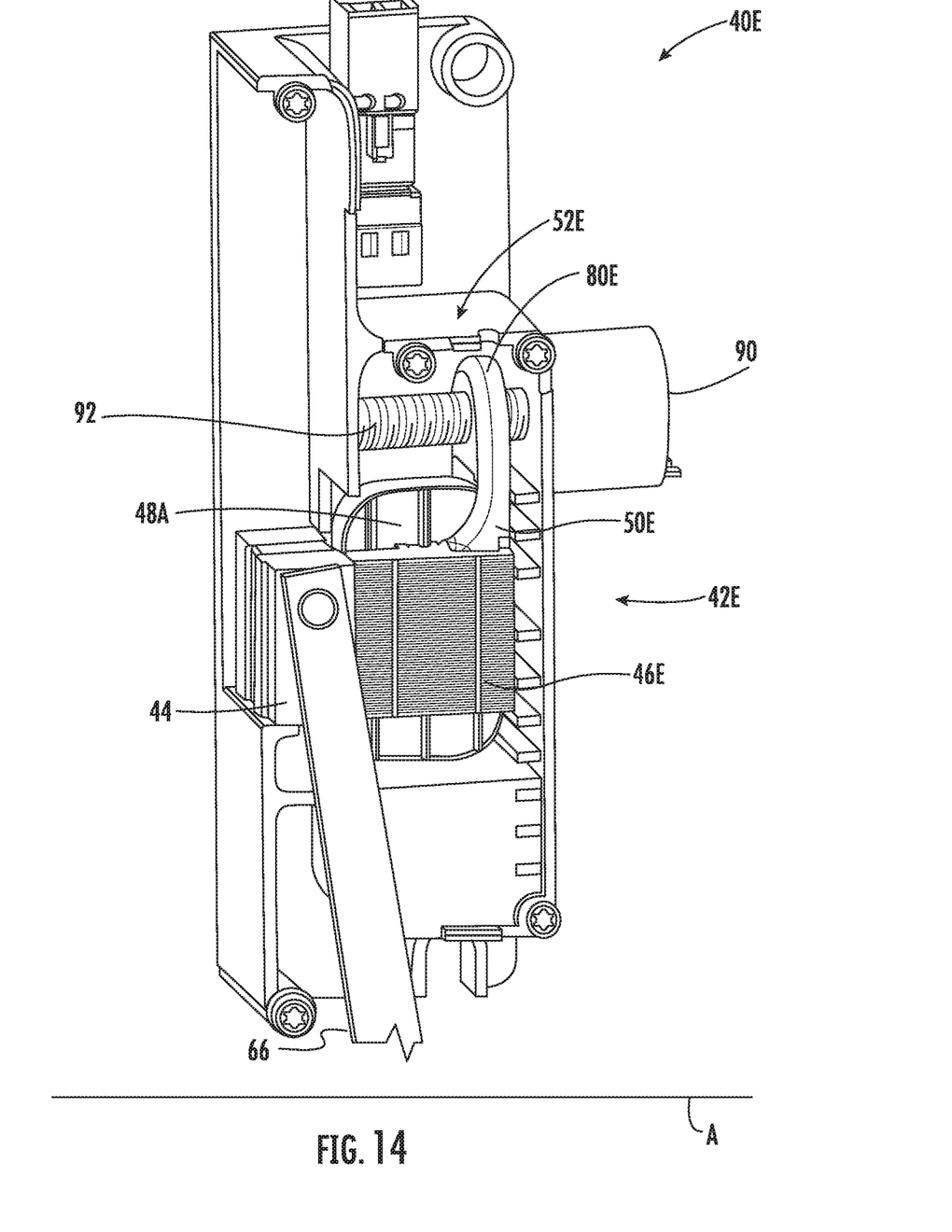
FIG. 14 is a cross-sectional view of an electromagnetic safety trigger according to an embodiment of the present disclosure.

Another embodiment is shown in FIG. 14, in which is illustrated an embodiment of an electromagnetic safety trigger 40E for an elevator safety system in a normal operating state. The electromagnetic safety trigger 40E includes an electromagnetic component 42E and a magnetic brake 44. The electromagnetic component 42E includes a core 46E and a coil 48A attached to a housing 50E. The housing 50E includes an extending portion 80E. The electromagnetic component 42E further includes a retention apparatus 52E. In the embodiment shown, the retention apparatus 52E includes a motor 90 driving a threaded shaft 92. The threaded shaft 92 threadingly engages a threaded hole formed through the extending portion 80E. In the illustrated embodiment, there is one motor 90/threaded shaft 92/threaded hole combination. In other embodiments, there may be greater than one motor 90/threaded shaft 92/threaded hole combination. Operation of the motor 90 to turn the threaded shaft 92 operates to move the electromagnetic component 42E in a direction parallel to the axis A. The electromagnetic component 42E will move toward the guide rail 20 when the motor 90 is operated in a first direction (during the reset operation), and away from the guide rail 20 when the motor is operated in the opposite direction thereafter.

It will therefore be appreciated that the present embodiments include an electromagnetic safety trigger 40 having a retention apparatus 52 capable of generating enough force to disengage the magnetic brake 44 from a metal component of the system during a reset condition.

While the invention has been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed is:

1. A selectively operable braking device for an elevator system including a car and a plurality of guiderails, comprising:
   a safety brake disposed on the car and adapted to be wedged against one of the guiderails when moved from a non-braking state into a braking state;

a rod operably coupled to the safety brake, the rod configured to move the safety brake between the non-braking state and braking state;

a magnetic brake operably coupled to the rod and disposed adjacent to the guiderail, the magnetic brake configured to move between a rail-engaging position and a rail-non-engaging position, said magnetic brake, when in the rail-engaging position contemporaneously with motion of the car, moving the rod in a direction to thereby move the safety brake from the non-braking state into the braking state; and an electromagnetic component, the electromagnetic component configured to move the magnetic brake from the rail-engaging position to the rail-non-engaging position upon receipt of a resetting signal;

wherein the electromagnetic component further comprises a retention apparatus configured to move the electromagnetic component in a direction parallel to an actuation axis, wherein the actuation axis is perpendicular to a direction of travel of the car;

wherein the retention apparatus further comprises a biasing member configured to apply a force to the electromagnetic component in the direction parallel to the actuation axis.

2. The braking device of claim 1, wherein the retention apparatus further comprises a housing wall, wherein the biasing member is disposed between the housing wall and the electromagnetic component, wherein the biasing component is operative to apply the force to the electromagnetic component in the direction parallel to the actuation axis.

3. The braking device of claim 1, wherein the biasing member comprises at least one spring.

4. The braking device of claim 3, wherein the biasing member comprises at least one compression spring.

5. The braking device of claim 4, wherein the biasing member comprises at least one compression conical spring.

6. The braking device of claim 3, wherein the biasing member comprises at least one leaf spring.

7. The braking device of claim 3, wherein the biasing member comprises at least one tension spring.

8. The braking device of claim 3, wherein the biasing member comprises at least one compressible foam member.

9. A selectively operable magnetic braking system comprising:

a safety brake disposed on a machine and adapted to arrest movement of the machine when moved from a non-braking state into a braking state;

a magnetic brake disposed adjacent to the machine, the magnetic brake configured to move between an engaging position and a non-engaging position, said magnetic brake, when in the engaging position contemporaneously with motion of the machine, moving to thereby move the safety brake from the non-braking state into the braking state;

an electromagnetic component configured to move the magnetic brake from the engaging position to the non-engaging position upon receipt of a resetting signal; and wherein the electromagnetic component further comprises a retention apparatus configured to move the electromagnetic component in a direction parallel to an actuation axis, wherein the actuation axis is perpendicular to a direction of travel of a car;

wherein the retention apparatus further comprises a biasing member configured to apply a force to the electromagnetic component in the direction parallel to the actuation axis.

10. The braking device of claim 9, wherein the retention apparatus further comprises a housing wall, wherein the biasing member is disposed between the housing wall and the electromagnetic component, wherein the biasing component is operative to apply the force to the electromagnetic component in the direction parallel to the actuation axis.

11. The braking device of claim 9, wherein the biasing member comprises at least one spring.

12. The braking device of claim 11, wherein the biasing member comprises at least one compression spring.

13. The braking device of claim 12, wherein the biasing member comprises at least one compression conical spring.

14. The braking device of claim 11, wherein the biasing member comprises at least one leaf spring.

15. The braking device of claim 11, wherein the biasing member comprises at least one tension spring.

16. The braking device of claim 11, wherein the biasing member comprises at least one compressible foam member.

* * * * *